(12) United States Patent
Bildoy

(10) Patent No.: US 10,218,700 B2
(45) Date of Patent: Feb. 26, 2019

(54) AUTHORIZATIONS FOR COMPUTING DEVICES TO ACCESS A PROTECTED RESOURCE

(71) Applicant: CA, Inc., New York, NY (US)

(72) Inventor: Leif E Bildoy, Lisbon (PT)

(73) Assignee: CA, Inc., Austin, TX (US)

( * ) Notice: Subject to any disclaimer, the term of this patent is extended or adjusted under 35 U.S.C. 154(b) by 0 days.

(21) Appl. No.: 14/628,537

(22) Filed: Feb. 23, 2015

(65) Prior Publication Data

US 2016/0248773 A1    Aug. 25, 2016

(51) Int. Cl.
*H04L 29/06* (2006.01)
*G06F 21/62* (2013.01)

(52) U.S. Cl.
CPC .......... *H04L 63/10* (2013.01); *G06F 21/6218* (2013.01); *H04L 63/20* (2013.01)

(58) Field of Classification Search
CPC ... H04L 63/08; H04L 63/10; H04L 29/08612; H04L 29/08594; H04L 67/146; H04L 63/0853; H04L 63/0823; H04L 9/006; H04L 9/083; G06F 21/6218
See application file for complete search history.

(56) References Cited

U.S. PATENT DOCUMENTS

| 7,398,311 | B2 * | 7/2008 | Joshi | G06F 17/30876 |
|---|---|---|---|---|
|  |  |  |  | 707/999.008 |
| 8,855,312 | B1 * | 10/2014 | Hodgman | G06F 21/44 |
|  |  |  |  | 380/270 |
| 8,935,777 | B2 * | 1/2015 | DeSoto | H04W 12/06 |
|  |  |  |  | 726/18 |
| 8,955,076 | B1 * | 2/2015 | Faibish | H04L 63/08 |
|  |  |  |  | 726/7 |

(Continued)

OTHER PUBLICATIONS

M. M Jones, et al., "The OAuth 2.0 Authorization Framework: Bearer Token Usage", Oct. 2012, Internet Engineering Task Force, RFC: 6750, p. 1-18.*

(Continued)

*Primary Examiner* — Nelson Giddins
(74) *Attorney, Agent, or Firm* — Vierra Magen Marcus LLP

(57) ABSTRACT

Authorization technology queries a user of an authorizing computing device for permission to allow another user of a requesting computing device to have access to a protected resource of the user. A requesting computing device may access a protected resource of the user by requesting authorization information for accessing the protected resource from an authorization manager server. Requesting and authorizing computing devices have respective agents for communicating with an authorization manager server as well as users and applications. An authorization manager server may provide the authorization information (or limited (Continued)

authorization) to the requesting computing device after the authorization manager server queries the user of the authorizing computing device for permission and receives permission from the authorizing computing device (via user input). The authorization information may limit access to the protected resource, such as limiting an amount of time to access and/or limiting an amount to charge an account.

18 Claims, 7 Drawing Sheets

(56) References Cited

U.S. PATENT DOCUMENTS

| | | | | |
|---|---|---|---|---|
| 9,038,152 | B1* | 5/2015 | Vazquez | H04L 63/08 726/10 |
| 9,059,982 | B2* | 6/2015 | Nishizawa | G06F 21/604 |
| 9,065,824 | B1* | 6/2015 | Valdivia | H04L 63/0884 |
| 9,076,006 | B1* | 7/2015 | Saylor | G06F 21/606 |
| 9,241,130 | B2* | 1/2016 | Ayers | H04L 63/029 |
| 9,456,343 | B1* | 9/2016 | Mihalache | H04L 63/0892 |
| 9,621,540 | B2* | 4/2017 | Almahallawy | H04L 63/062 |
| 2005/0010756 | A1* | 1/2005 | Clerc | G06F 21/33 713/155 |
| 2008/0134305 | A1* | 6/2008 | Hinton | H04L 63/08 726/5 |
| 2011/0138062 | A1* | 6/2011 | Bansod | H04L 63/061 709/227 |
| 2012/0054841 | A1* | 3/2012 | Schultz | G06F 21/44 726/6 |
| 2013/0006862 | A1* | 1/2013 | Graham | 705/44 |
| 2013/0055357 | A1* | 2/2013 | Etchegoyen | G06F 21/34 726/4 |
| 2013/0219479 | A1* | 8/2013 | DeSoto | H04W 12/06 726/6 |
| 2013/0227118 | A1* | 8/2013 | Simen | H04L 67/24 709/224 |
| 2013/0227119 | A1* | 8/2013 | Simen | H04L 67/24 709/224 |
| 2013/0238896 | A1* | 9/2013 | Pedlow, Jr. | G06F 21/10 713/156 |
| 2014/0012997 | A1* | 1/2014 | Erbe | H04L 67/26 709/228 |
| 2014/0101781 | A1* | 4/2014 | Bouknight | G06F 21/10 726/28 |
| 2014/0157351 | A1* | 6/2014 | Canning | H04L 63/20 726/1 |
| 2014/0164776 | A1* | 6/2014 | Hook | H04L 9/14 713/171 |
| 2014/0181504 | A1* | 6/2014 | Almahallawy | H04L 63/062 713/156 |
| 2014/0223516 | A1* | 8/2014 | Vongsouvanh | H04L 63/0492 726/4 |
| 2014/0230020 | A1* | 8/2014 | Mogaki | H04L 63/10 726/4 |
| 2014/0380429 | A1* | 12/2014 | Matsugashita | H04L 63/0823 726/4 |
| 2015/0089570 | A1* | 3/2015 | Sondhi | H04L 63/08 726/1 |
| 2015/0089622 | A1* | 3/2015 | Sondhi | H04L 63/08 726/9 |
| 2015/0113621 | A1* | 4/2015 | Glickfield | H04L 63/08 726/7 |
| 2015/0134956 | A1* | 5/2015 | Stachura | H04L 63/0807 713/168 |
| 2015/0140964 | A1* | 5/2015 | Horton | H04W 12/08 455/410 |
| 2015/0143468 | A1* | 5/2015 | Hebert | H04L 63/10 726/4 |
| 2015/0163225 | A1* | 6/2015 | He | H04L 63/08 726/1 |
| 2015/0222615 | A1* | 8/2015 | Allain | H04L 63/08 726/4 |
| 2015/0312233 | A1* | 10/2015 | Graham, III | H04L 9/006 713/171 |
| 2015/0312236 | A1* | 10/2015 | Ducker | H04L 63/08 726/4 |
| 2016/0014157 | A1* | 1/2016 | Gomez | H04L 63/20 726/1 |
| 2016/0050184 | A1* | 2/2016 | Ockenfels | H04L 63/045 713/171 |
| 2016/0072804 | A1* | 3/2016 | Chien | H04L 67/16 726/4 |
| 2016/0150406 | A1* | 5/2016 | Vincent | G06F 21/34 726/6 |
| 2016/0197914 | A1* | 7/2016 | Oberheide | H04L 63/0838 713/183 |
| 2016/0337351 | A1* | 11/2016 | Spencer | H04L 63/0876 |
| 2017/0163656 | A1* | 6/2017 | Horton | H04W 12/08 |

OTHER PUBLICATIONS

M. Jones, et al., "The OAuth 2.0 Authorization Framework: Bearer Token Usage", Oct. 2012, Internet Engineering Task Force, RFC: 6750, p. 1-18.*
D. Hardt, et al., "The OAuth 2.0 Authorization Framework", Oct. 2012, Internet Engineering Task Force, RFC: 6749, p. 1-76.*
J. Richer, et al., "OAuth 2.0 Dynamic Client Registration Protocol", Jul. 2015, Internet Engineering Task Force, RFC: 7591, p. 1-39.*
"OAuth," Wikipedia, the free encyclopedia, modified Jan. 30, 2015, downloaded on Feb. 5, 2015, [http://en.wikipedia.org/wiki/OAuth], 10 pages.
"User-Managed Access," Wikipedia, the free encyclopedia, modified Dec. 18, 2014, downloaded on Feb. 5, 2015, [http://en.wikipedia.org/wiki/User-Managed_Access], 3 pages.

* cited by examiner

AUTHORIZATIONS FOR COMPUTING DEVICES TO ACCESS A PROTECTED RESOURCE

BACKGROUND

The present disclosure relates to communicating between computing devices, and in particular to authorizing access to a protected resource of a computing device.

Typically, authorization is the process of providing a user permission to have access to a resource of a computing device. In a multi-user computing system, a system administrator may define for the system which users are allowed access to the system and what privileges of use. When a user logs into a computing system or application, the system or application may identify what resources the user may have access during this session. Thus, authorization may be seen as both the preliminary setting up of permissions by a system administrator and the actual checking of the permission values that have been set up when a user logs in.

In computing device networks, an authorization system may provide an application on a computing device access to a protected resource of the user. A protected resource of the user may be provided by a resource owner. For example, a user may allow a travel application on a computing device to have access to a social graph in the user's social media account. Typically, a user pre-registers the application with an authorization server so that the application may access the protected resource of the user. An authorization system may specify a process for resource owners to authorize access to their protected resources.

BRIEF SUMMARY

Authorization technology queries an authorizing computing device for permission to allow a requesting computing device to have access to a protected resource of a user in an embodiment. A requesting computing device may access a protected resource of a user (or the authorizing computing device) by requesting authorization information for accessing the protected resource from an authorization manager server. Requesting and authorizing computing devices have respective agents for communicating with an authorization manager server as well as users and applications. An authorization manager server may provide the authorization information (or limited authorization) to the requesting computing device after the authorization manager server queries the authorizing computing device for permission and receives permission from the authorizing computing device (via user input). The authorization information may limit access to the protected resource, such as limiting an amount of time to access and/or limiting an amount to charge an account.

According to an aspect of the disclosure, a method comprises receiving, by a first computing device, an access request from a second computing device to access a protected resource that is accessible by a third computing device. The first computing device determines whether the second computing device has permission to access the protected resource. The first computing device prepares an authorization request to the third computing device to allow the second computing to access the protected resource. The authorization request to the third computing device is output by the first computing device. The first computing device receives an indication from the third computing device that the second computing device has permission to access the protected resource. The first computing device outputs authorization information to the second computing device so that the second computing device uses the authorization information to access the protected resource.

According to another aspect of the disclosure, an apparatus comprises an integrated circuit processor and a computer readable storage medium to store computer program code. The computer program code configures the integrated circuit processor to: 1) receive an access request from a computing device to access a protected resource, 2) access an identity of another computing device that has access to the protected resource, 3) prepare an authorization request to access the protected resource, 4) output the authorization request to access the protected resource to another computing device, 5) receive a response from another computing device that indicates a permission to a limited access of the protected resource, and 6) output authorization information to the computing device so that the computing device outputs the authorization information to obtain limited access of the protected resource.

According to another aspect of the disclosure, a computer program product comprises a computer readable storage medium having computer program code embodied therewith. The computer program code comprises: 1) computer program code configured to receive a request from a first mobile computing device of a first user to access a protected resource of a second user; 2) computer program code configured to determine whether the first mobile computing device has permission to access the protected resource of the second user; 3) computer program code configured to prepare a request for limited access of the first computing device to the protected resource of the second user when the first mobile computing device does not have permission to access the protected resource of the second user; 4) computer program code configured to output the request for limited access of the first computing device to the protected resource of the second user; 5) computer program code configured to receive a response to the request for limited access of the first computing device to the protected resource of the second user that indicates a limited access of the first computing device; and 6) computer program code configured to output authorization information to the first computing device so that the first computing device outputs the authorization information to obtain limited access of the protected resource of the second user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Figure 1:
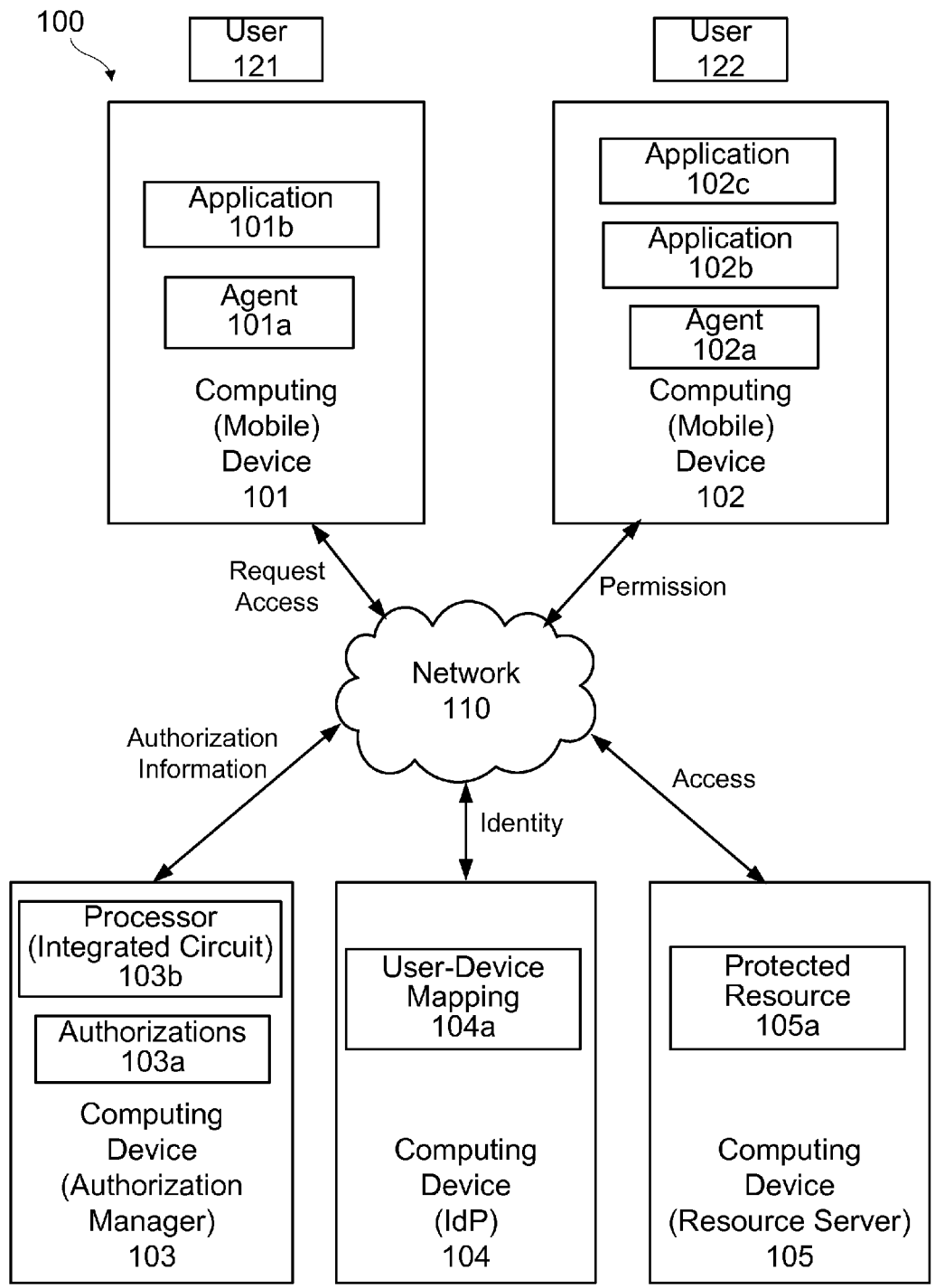
FIG. 1 illustrates a high-level block diagram of a system (or apparatus) comprising a computing device to provide authorization to access a protected resource, according to an embodiment.

In embodiments, authorization technology includes an authorization manager computing device that can interact with a requesting computing device to propagate near real time authorization requests directly to an authorizing computing device of a another user for access (or limited access) to a protected resource. In embodiments, a dynamic request-response method between computing device of users for authorizations to a protected resource, via the authorization manager computing device, provide a level of immediacy where users can obtain an authorization in near real time. Often, a user of an authorizing computing device, such as a mobile computing device, may have their computing device nearby throughout the day so as to be able to provide user input that indicates permission to access to the protected resource. Authorization technology may be used in, but not limited to, health care, financial services, remote payments, and enterprise approval workflows embodiments.

Authorization technology enables an authorizing computing device, such as a mobile computing device, to allow a requesting computing device to have access to a protected resource of a user of the authorizing computing device. In embodiments, protected resources may include, but not limited to, a service (application), data, electronic health record (or health information), financial account, telecommunication account, enterprise workflow program and/or application program interface, A requesting computing device may access a protected resource of a user of the authorizing computing device by requesting authorization information for accessing the protected resource from an authorization manager server. Authorization information may include, but are not limited to, a user token, access token and/or signed certificate. Requesting and authorizing computing devices have respective agents for communicating with an authorization manager server as well as users and applications. An authorization manager computing device may provide the authorization information to access the protected resource to the requesting computing device after the authorization manager server queries the authorizing computing device for permission and also receives permission from the authorizing computing device (via user input). The authorization information may limit access to the protected resource, such as limiting an amount of time to access and/or limiting an amount to charge an account.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer program code embodied thereon.

Any combination of one or more computer readable media may be utilized. The computer readable media may be a computer readable signal medium or a computer readable storage medium. A computer readable storage medium may be, for example, but not limited to, an electronic (integrated circuit), magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated signal with computer program code embodied therein, for example, in baseband or as part of a carrier wave. Propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, Radio Frequency (RF), etc., or any suitable combination of the foregoing.

Computer (readable) program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer (or computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations, sequence diagrams and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Similarly, each arrow of a sequence diagram may likewise be implemented by computer program instructions. These computer program instructions may be provided to a processor of a general purpose computer (or computing device), special purpose computer, or other programmable data processing apparatus to produce a machine, such that the instructions, which execute via the processor of the computer or other programmable instruction execution apparatus, create a mechanism for implementing the functions/acts specified in the flowchart, sequence diagram and/or block diagram block or blocks.

These computer program instructions may also be stored in a computer readable storage medium that when executed can direct a computing device (or processor), other programmable data processing apparatus, or other devices to function in a particular manner, such that the instructions when stored in the computer readable storage medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 is a high-level block diagram of an apparatus (or system) 100 comprising networked computing devices. In an embodiment, a system 100 includes a plurality of computing devices 101-105 coupled to a network 110. In embodiments, computing devices 101-102 are mobile computing device. In other embodiments, more or fewer types of computing devices may be used. In embodiments, computing devices 101-105, singly or in combination, may be a desktop, netbook, laptop, tablet, personal digital assistant, mobile telephone and/or similar device. In other embodiments, computing devices may include wearable computers, embedded system, mainframe and/or other computing devices having processors executing or reading computer programmable code.

In embodiments, one or more computing devices illustrated in FIG. 1 includes at least an integrated circuit processor executing (or reading) computer (readable) program code stored on a computer readable storage media, such as an integrated circuit memory.

In particular, computing device 103, embodied as an authorization manager server (or authorization manager computing device), includes integrated circuit processor 103b and authorizations 103a, embodied as computer program code. In embodiments, computing device 103 communicates with computing devices 101-102 and 104-105 via network 110. In embodiments, computing device 103 manages users' authorization requests, authorization request responses and declarations (or registrations). In embodiments, each authorization or permission to access a protected resource is stored in authorizations 103a. In an embodiment, each time a request is received, computing device 103 checks if there is a corresponding authorization stored. If not, the authorization request is re-routed to a device agent closest to the intended recipient in an embodiment.

In a particular embodiment, computing device 103 receives requests for authorization to access protected resource 105a (from computing device 101), outputs a request for authorization (to computing device 102) and receives a response to the request for authorization (permission from computing device 102) as well as outputs authorization information (to computing device 101) for access (or limited access) to protected resource 105a when permission is received. In embodiments, requests for authorization may originate from an application, agent and/or user. In embodiments, requests for authorization may be authenticated by computing device 103.

Figure 4:
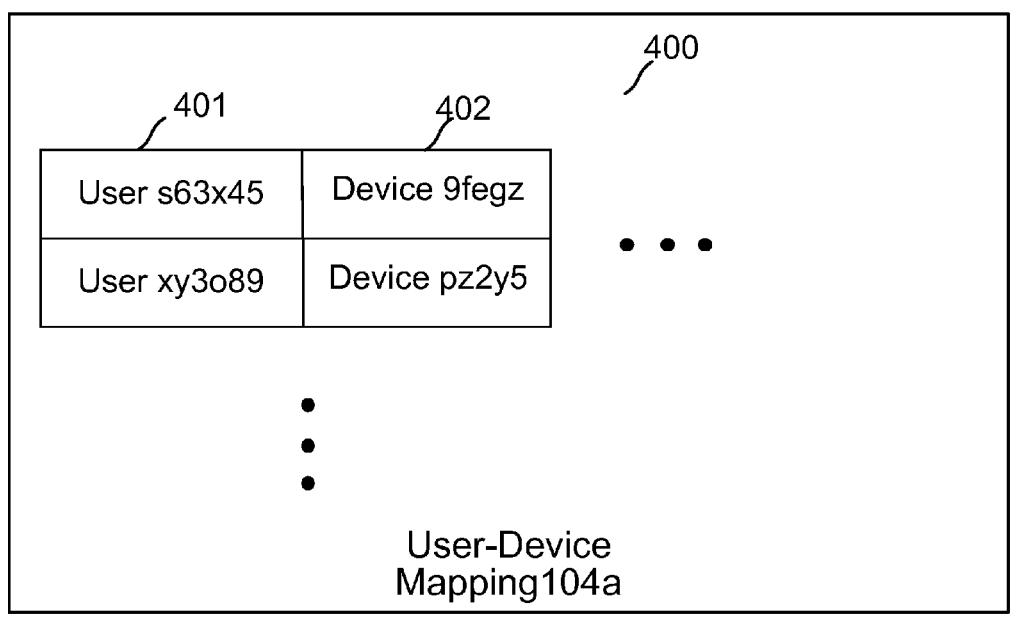
FIG. 4 illustrates a mapping between users and devices according to an embodiment.

Computing device 104, embodied as an identity provider (IdP) computing device, includes an integrated circuit processor and user-device mapping 104a, embodied as computer program code. In an embodiment, user-device mapping 104a includes identity relational information that may be stored in a database that is stored in a computer readable storage media. In embodiments, user-device mapping 104a is accessible (written to and/or read from) by an integrated circuit processor. In an embodiment, the relational identity information may include a data structure that identifies users and/or computing devices that may provide permission to access a particular protected resource. In an embodiment, user-device mapping 104a includes identity information 400 that may include, along with other information, user identities 401 and computing device identities 402 as illustrated in FIG. 4.

Computing device 104 is responsible for providing identity information that may be used by system 100 in an embodiment. A user of system 100 will be provisioned with an identity from computing device 104. In an embodiment, computing device 104 stores a mapping between users and computing devices. For example, upon a query, an computing device 104 provides identity of a user and/or computing device that may provide permission to a protected resource.

In embodiments, computing device 104 communicates with computing devices 103 and 105 via network 110. In an embodiments, computing device 104 is responsible for (a) providing identifiers for users, via computing device 103, looking to interact with a system (or computing device 105 in an embodiment), and (b) asserting to such a system that such an identifier presented by a user is known to the IdP computing device (or computing device 104 in an embodiment), and (c) possibly providing other information about the user (and/or computing device) that is known to the IdP computing device. An IdP computing device may be known as an identity provider or an identity assertion provider. In embodiments, computing device 103 and 104 may be the same computing device.

Computing device 105, embodied as resource (server) computing device, includes integrated circuit processor and protected resource 105a, embodied as computer program code. In an embodiment, computing device 105 provides a protected resource after receiving predetermined authorization information from a computing device, such as computing devices 101-102. In embodiments, a protected resource includes providing, but is not limited to, a service, data, application, application program interface, telecommunication account, financial service account (such as a bank account), health information (such as an electronic health record) and/or enterprise workflow program. In an embodiment, a user 122 owns or has access to the protected resource and user 121 requests access to the protected resource.

Computing device 101, embodied as a mobile computing device, includes integrated circuit processor as well as agent 101a and application 101b, embodied as computer program code. Agent 101a may include an application program interface or library of program code that may output requests for authorization to protected resource 105a as well as receive requests for authorization to protected resource 105a. In an embodiment, agent 101a includes agent computer program code. In an embodiment, user 121 owns or uses computing device 101.

Computing device 102, embodied as a mobile computing device, includes integrated circuit processor as well as agent 102a and applications 101b-c, embodied as computer program code. Agent 101b may include an application program interface or library of program code that may output requests for authorization to protected resource 105a as well as receive requests for authorization to protected resource 105a. In an embodiment, agent 102a includes agent computer program code. In an embodiment, user 122 owns or uses computing device 102.

Agents 101a and 102a are responsible for creating a trust relationship between users, applications and computing devices in an embodiment. In embodiment, agents 101a-b are responsible for requesting and/or using authorization information such as user tokens, access tokens and signed certificates, to access protected resources. Agents 101a and 102a may ensure that the communication with other computing devices is configured and that mutual trust is set up in an embodiment. Agents 101a and 102a may provide a user interface to obtain permission to access a protected resource as indicated by a user input as well as provide responses to authorization requests.

In embodiments, at least computing devices 101-102 have user interfaces to access their respective computing devices. In embodiments, computing devices 101-102 may include browsers to communicate with computing devices. In embodiments, a user interface includes computer program code as well as hardware components. A user interface may include input devices such as a touchscreen, microphone, camera, keyboard, mouse, pointing device and/or position sensors. Similarly, a user interface may include output devices, such as a display, vibrator and/or speaker, to output images, characters, vibrations, speech and/or video as an output. A user interface may also include a natural user interface where users 121 and 122 may speak, touch or gesture to a user interface to provide input.

In embodiments, one or more computing device illustrated in FIG. 1 may act as a server while one or more computing devices may act as a client. In an embodiment, one or more computing devices may act as peers in a peer-to-peer (P2P) relationship.

Computing devices illustrated in FIG. 1 communicate or transfer information by way of network 110. In an embodiment, network 110 may be the Internet, a WAN or a LAN, singly or in combination. In an embodiment, computing devices illustrated in FIG. 1 use one or more protocols to transfer information, such as Transmission Control Protocol/ Internet Protocol (TCP/IP). In embodiments, computing devices illustrated in FIG. 1 include input/output (I/O) computer program code as well as hardware components, such as I/O circuits to receive and output information from and to other computing devices, via network 110. In an embodiment, an I/O circuit may include a transmitter and receiver circuit.

Figure 2:
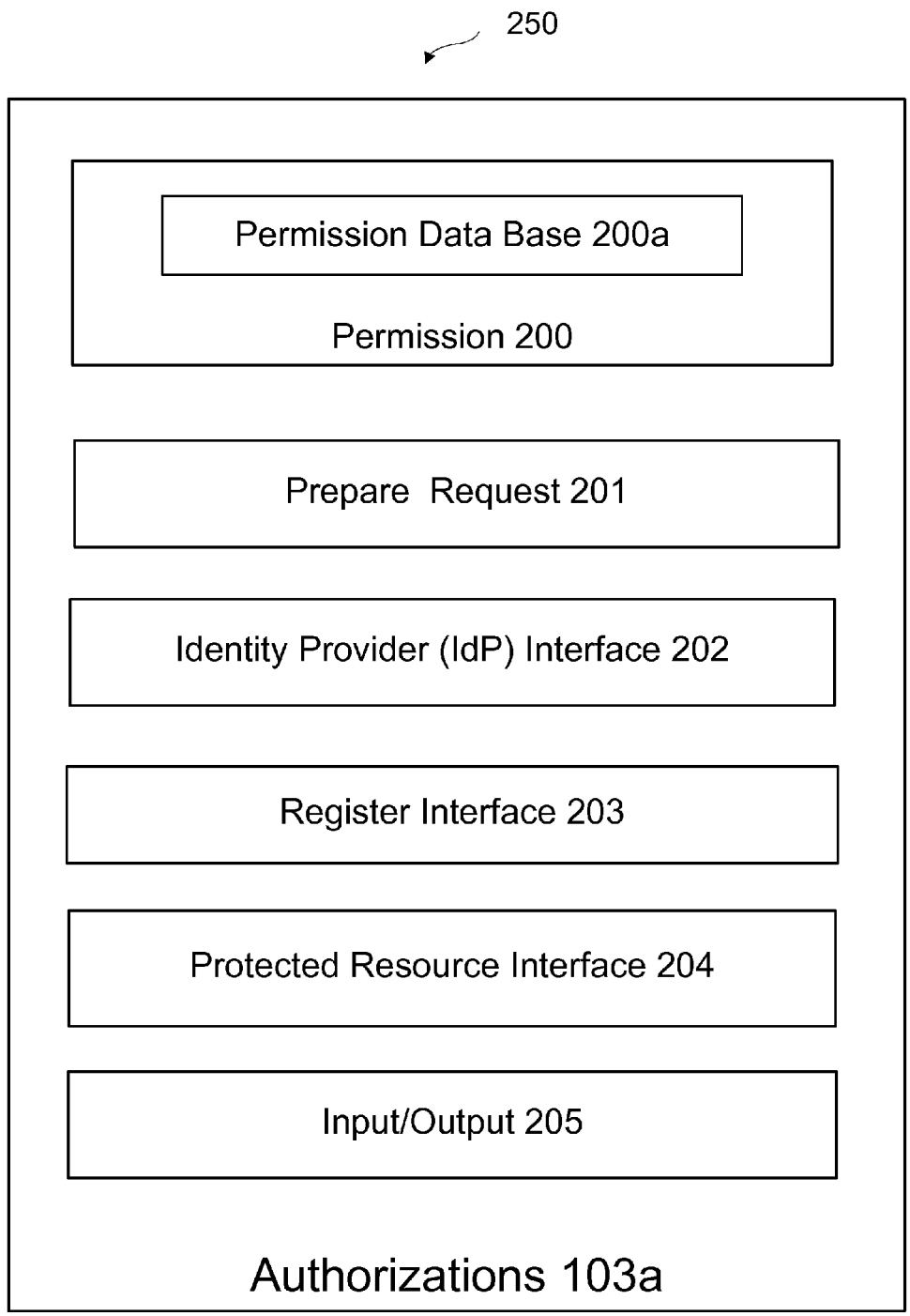
FIG. 2 illustrates a software architecture to provide authorization to access a protected resource according to an embodiment.

FIG. 2 illustrates a software architecture 250 for a system 100 shown in FIG. 1 according to embodiments. In an embodiment, FIG. 2 illustrates the software architecture of authorizations 103a shown in FIG. 1. Software architecture 250 illustrates computer program code or instructions (or portions thereof) to provide authorization described herein. In embodiments, one or more processors execute (or read) computer (or processor) program code to provide at least portions of authorization technology that provides authorization information to a requesting computing device after permission is obtain from an authorizing computing device, via an authorization manager computing device.

In embodiments, computer program code illustrated in FIG. 2 may be embodied as a software program, software object, software function, software subroutine, software method, software instance, script and/or a code fragment, singly or in combination. In order to clearly describe the technology, computer program code shown in FIG. 2 is described as individual software component or components. In embodiments, the software components illustrated in FIG. 2, singly or in combination, may be stored (in computer readable storage medium(s)) and/or executed by a single or distributed computing device (processor) architecture. As one of ordinary skill in the art would understand, the functions performed by the various software components described herein are exemplary. In other embodiments, software components identified herein may perform more or less functions.

In embodiments illustrated by FIG. 2, authorizations 103a includes permission 200 including permission data base 200a, prepare request 201, identity provider (IdP) interface 202, register interface 203, protected resource interface 204 and input/output (I/O) 205 software components.

Permission 200, in an embodiment, is responsible for storing and accessing permissions to protected resources for computing devices and/or users. In an embodiment, a user 122 may provide permission for another user, such as user 121, to access protected resource 105a. In an embodiment, user 122 may provide input to computing device 102 that outputs a permission to computing device 103 via network 110. In embodiments, a permission may provide limited access to a protected resource 105a.

Figure 3:
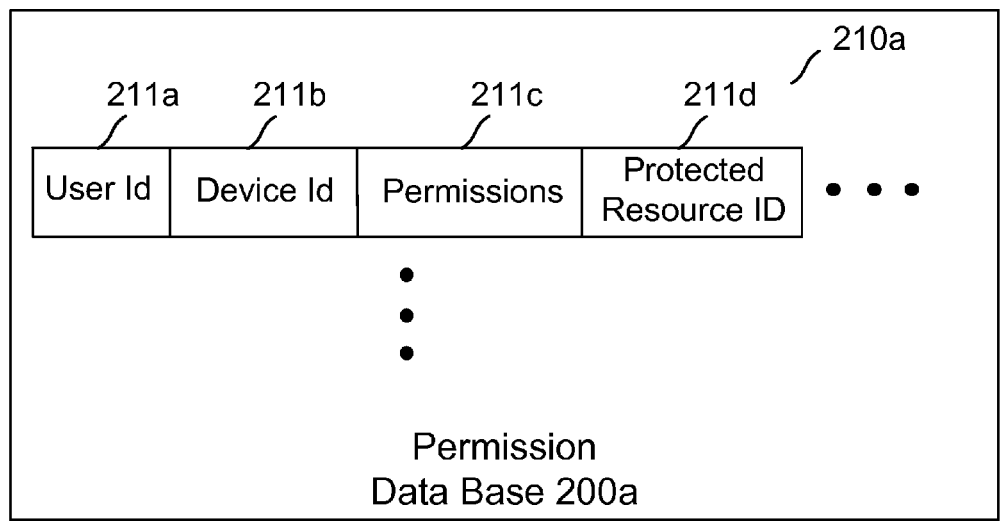
FIG. 3 illustrates authorization information according to an embodiment.

In an embodiment, permission 200 includes permission data base 200a. In an embodiment, permission data base 200a, as illustrated in FIG. 3, may store relational authorization information in a data base that is stored in a computer readable storage media. In embodiments, permission data base 200a is accessible (written to and/or read from) by an integrated circuit processor. In an embodiment, the relational information may include a data structure that identifies users, devices and permissions to protected resources in an authorization system. For example, relational information 210a in the form of a record having a plurality fields (contiguous or noncontiguous) (or portions of information) may include user identification (Id) 211a, device identification (Id) 211b, permissions 211c (to protected resource) and protected resource identification (id) 211d digital information. In embodiments, such digital information may be stored in one or more memory locations or addresses in computer readable storage media. In embodiments, relational information 210a may have information stored as codes that represent the information. In embodiments, relational information 210a may include more or less information and may be stored in a variety of ways and/or structures. In embodiments, relational information 210a may include addresses or contact information to contact a particular computing device.

Prepare request 201, in an embodiment, is responsible for at least preparing an authorization request to an authorizing computing device. In an embodiment, an authorization request includes, at least, an address to an intended recipient computing device.

Identity provider (IdP) interface 202, in an embodiment, is responsible for obtaining identity information, such as users and/or computing devices that may grant permission to access a particular protected resource. In an embodiment, IdP interface 202 queries computing device 104 to obtain identity information and then may pass the identity information to prepare request 201 in an embodiment.

Register interface 203, in an embodiment, is responsible for providing an interface for a user providing information regarding users and computing devices. For example, register interface 203 may provide a user interface accessible by a browser to allow a user to input permissions for other users to access protected resources. In an embodiment, register interface 203 provides information values to relational information 210a in response to a user's input.

Protected resource interface 204 is responsible for providing an interface for information transferred from and to a protected resource, such as protected resource 105a, that is used by computing device 103 in providing authorization information. For example, protected resource 105a, via computing device 105 and network 110, may define or output a particular type of authorization information that may be used to access protected resource 105a. Various computing devices that provide various protected resources may require different types of authorization information in embodiments. In an embodiment, a particular type of authorization information for a particular protected resource may be stored in permission data base 200a in an embodiment.

Input/output 205, in an embodiment, is responsible for outputting and receiving information, such authorization requests, responses to authorization requests (such as inputted permission) and authorization information, to and from other networked computing devices, such as computing devices 101-102 and 104-105.

Returning to FIG. 1, a protocol for operating system 100 is described below. In embodiments, agents 101a and 102a register with computing devices 103 and 104 in a first protocol step. In embodiments, agents 101a and 102a are extensions of computing device 103, embodied as an authorization manager, and establish a sufficient level of trust between the two. In an embodiment, a binding between various token artefacts is established as a part of a registration process. Similarly, computing devices 101 and 102 are registered and provisioned to set up two way trust between computing devices 101-102 and 103-104 in embodiments. In an embodiment, applications, such as applications 101b and 102b-c, are set up with OAuth access tokens and agents 101a, 102a store and maintain a secure/tokens on respective computing devices.

In a second protocol step, user 121 may then invoke application 101b that uses an application program interface of agent 101a to attempt to access a protected resource 105a of user 122.

In a third protocol step, an access request is sent from agent 101a in computing device 101 to computing device 105, embodied as a resource server. The access request will be reject by computing device 105 when valid authorization information, such as a token, is not provided by agent 101a.

In a fourth protocol step, agent 101a will send an authorization request to computing device 103, embodied as an authorization manager. In an alternate embodiment, computing device 105 may redirect the access request as an authorization request to computing device 103 when the access request is rejected by computing device 105.

In a fifth protocol step, computing device 103, embodied as an authorization manager, checks stored authorization or permissions information, such as in permission data base 200a, to determine whether a valid authorization or permission associated with the particular requesting computing device (computing device 101) and/or user (user 121) is stored.

In a sixth protocol step, computing device 103 issues or outputs authorization information, such as a token, to computing device 101, and in particular agent 101a that may provide the authorization information to user 121 and/or application 101b.

In a seventh protocol step, computing device 103 queries computing device 104, embodied as an identity provider computing device, which maintains and stores a mapping between users and computing devices to determine which computing device to redirect or output a request for authorization to. For example, computing device 103 queries computing device 104 to determine that computing device 102 (and/or user 122) may provide permission to computing device 101 (and/or user 121) to access protected resource 105a. In an embodiment, user-device mapping 104a includes identity information regarding computing devices and users that may grant permission to authorization requests to protected resources. In embodiments, user-device mapping 104a include respective addresses to contact each computing device and may output such address information upon a query.

In an eighth protocol step, computing device 103 redirects or outputs an authorization request to computing device 102, in particular agent 102a. In an embodiment, the authorization request includes an address to contact computing device 102.

In a ninth protocol step, upon receiving a valid request, agent 102a queries user 122 through a user interface for computing device 101 (and/or user 121) to have permission to access protected resource 105a. In an embodiment, the query may include a permission for limited access to protected resource 105a. In an embodiment, a user interface displays a brief description of the authorization request and user 122 may confirm or reject the authorization request.

In a tenth protocol step, when user 122 authorizes a request for access by way of user input, agent 102a provides a response to computing device 103 including an indication of the inputted authorization (or rejection).

In a eleventh protocol step, computing device 103 provides authorization information to computing device 101, and in particular agent 101a, so that application 101b may access protected resource 105a using the authorization information.

Figure 5:
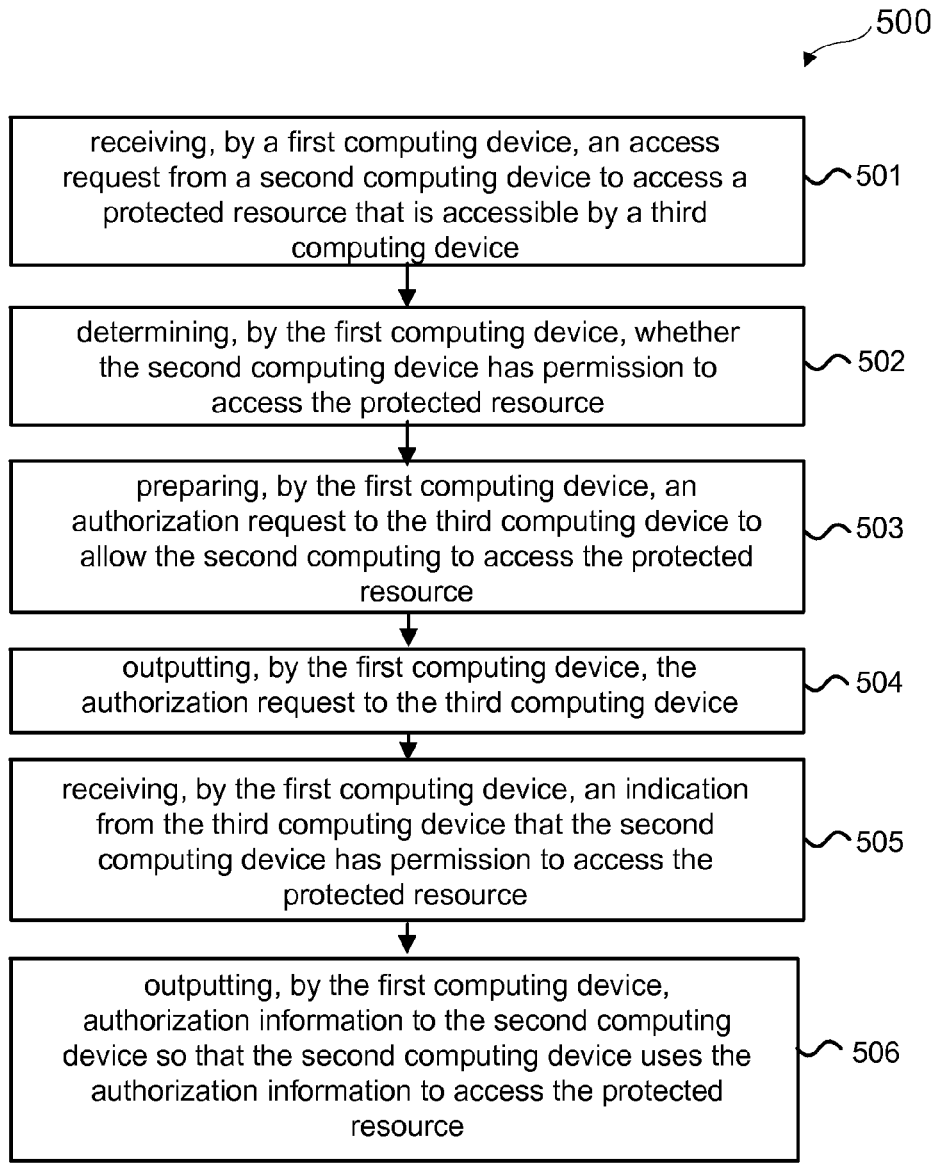
FIGS. 5-7 illustrate flowcharts of methods to provide authorization to access a protected resource according to an embodiments.
Figure 6:
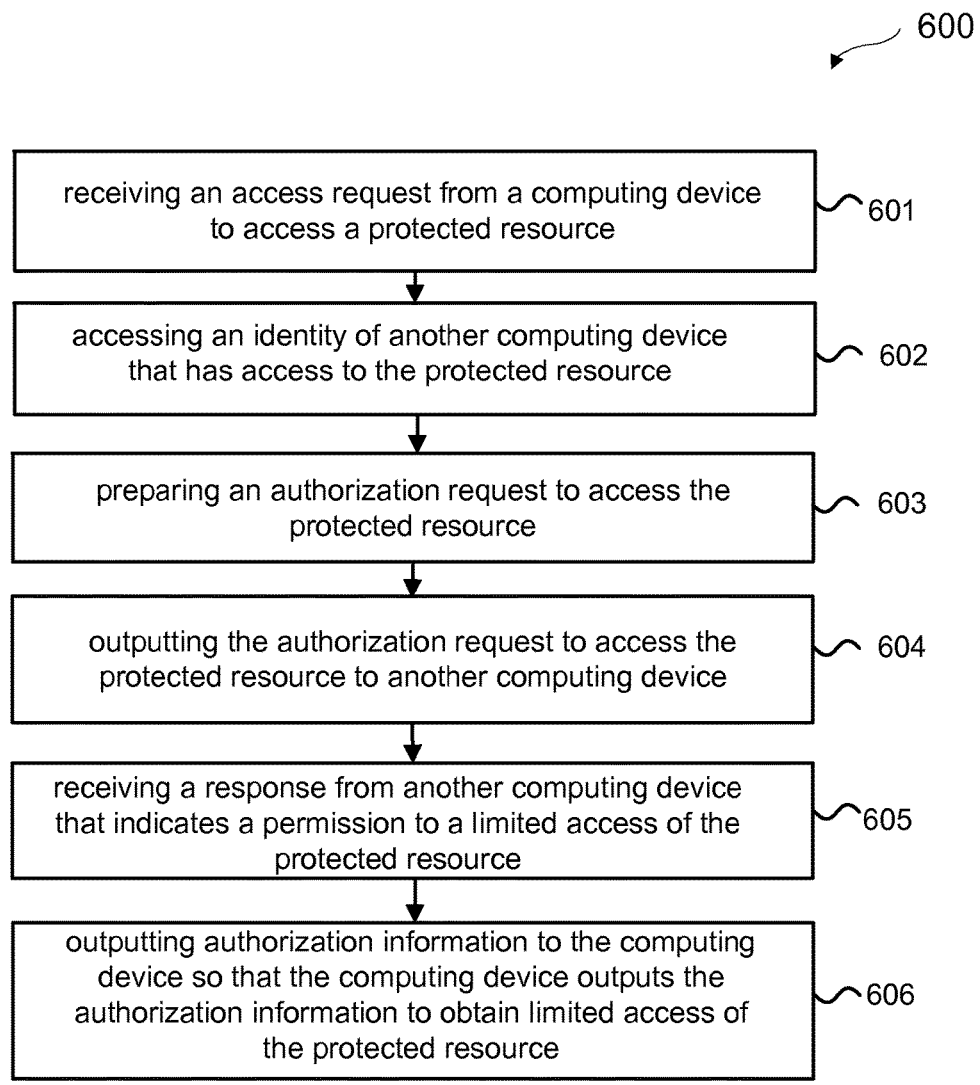
Figure 7:
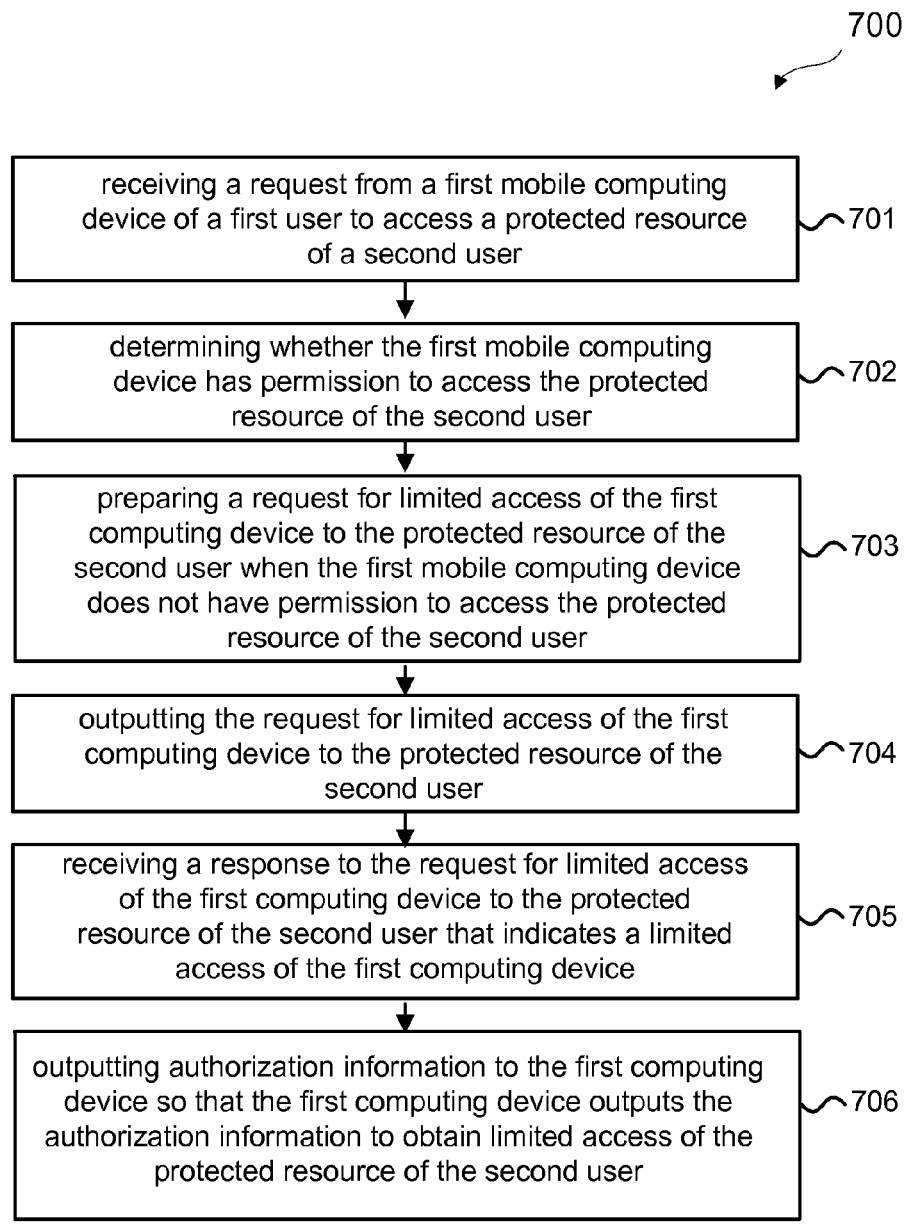

FIGS. 5-7 illustrate flowcharts of methods to provide authorization to access a protected resource according to an embodiments. In particular, FIG. 5 illustrate a method 500 to provide authorization to access a protected resource. In an embodiment, computing device 103 (integrated circuit processor 103b) execute computer program code (or processor readable instructions), such as one or more software components shown in FIG. 2, to perform at least portions of method 500.

Logic block 501 represents receiving, by a first computing device, an access request from a second computing device to access a protected resource that is accessible by a third computing device. In an embodiment, computing device 103, such as an authorization manager, receives an access request from computing device 101. In an alternate embodiment, computing device 103 receives an access request from computing device 105, such as a resource server. In an embodiment, computing device 103 executing computer program code, such as authorizations 103a (and in particular input/output 205 shown in FIG. 2), performs at least a portion of this function.

Logic block 502 represents determining, by the first computing device, whether the second computing device has permission to access the protected resource. In an embodiment, computing device 103 executing computer program code, such as permission 200 shown in FIG. 2, performs at least a portion of this function. In an embodiment, permission 200 accesses permission data base 200*a* to determine whether the second computing device has permission to access the protected resource.

Logic block 503 represents preparing, by the first computing device, an authorization request to the third computing device to allow the second computing to access the protected resource. In an embodiment, computing device 103 executing computer program code, such as authorizations 103*a* (and in particular prepare request 202 shown in FIG. 2), performs at least a portion of this function.

Logic block 504 represents outputting, by the first computing device, the authorization request to the third computing device. In an embodiment, computing device 103 executing computer program code, such as authorizations 103*a* (and in particular input/output 205 shown in FIG. 2), performs at least a portion of this function.

Logic block 505 represents receiving, by the first computing device, an indication from the third computing device that the second computing device has permission to access the protected resource. In an embodiment, computing device 103 executing computer program code, such as authorizations 103*a* (and in particular input/output 205 shown in FIG. 2), performs at least a portion of this function.

Logic block 506 represents outputting, by the first computing device, authorization information to the second computing device so that the second computing device uses the authorization information to access the protected resource. In an embodiment, computing device 103 executing computer program code, such as authorizations 103*a* (and in particular input/output 205 shown in FIG. 2), performs at least a portion of this function.

FIG. 6 is a flowchart illustrating a method 600 to provide authorization to access a protected resource according to an embodiment.

Logic block 601 illustrates receiving an access request from a computing device, such as computing device 101, to access a protected resource. In an embodiment, computing device 103, such as an authorization manager, receives an access request from computing device 101. In an alternate embodiment, computing device 103 receives an access request from computing device 105, such as a resource server. In an embodiment, computing device 103 executing computer program code, such as authorizations 103*a* (and in particular input/output 205 shown in FIG. 2), performs at least a portion of this function.

Logic block 602 illustrates accessing an identity of another computing device, such as computing device 102 that has access to the protected resource. In an embodiment, computing device 103 executing computer program code, such as authorizations 103*a* (and in particular IdP interface 202 shown in FIG. 2), performs at least a portion of this function. In an embodiment an identity of another computing device is retrieved from user-device mapping 104*a* stored on computing device 104 by way of IdP interface 202.

Logic block 603 illustrates preparing an authorization request to access the protected resource, such as protected resource 105*a* provided by computing device (resource server) 105. In an embodiment, computing device 103 executing computer program code, such as authorizations 103*a* (and in particular prepare request 202 shown in FIG. 2), performs at least a portion of this function.

Logic block 604 illustrates outputting the authorization request to access the protected resource to another computing device, such as computing device 102. In an embodiment, computing device 103 executing computer program code, such as authorizations 103*a* (and in particular input/output 205 shown in FIG. 2), performs at least a portion of this function. In an embodiment, the authorization request includes an address to another computing device.

Logic block 605 illustrates receiving a response from another computing device that indicates a permission to a limited access of the protected resource. In an embodiment, computing device 103 executing computer program code, such as authorizations 103*a* (and in particular input/output 205 shown in FIG. 2), performs at least a portion of this function.

Logic block 606 illustrates outputting authorization information to the computing device so that the computing device outputs the authorization information to obtain limited access of the protected resource. In an embodiment, computing device 103 executing computer program code, such as authorizations 103*a* (and in particular input/output 205 shown in FIG. 2), performs at least a portion of this function. In an embodiment, the authorization information may include a user token, access token and/or signed certificate.

FIG. 7 is a flowchart illustrating a method 700 to provide authorization to access a protected resource according to an embodiment.

Logic block 701 illustrates receiving a request from a first mobile computing device of a first user to access a protected resource of a second user. In an embodiment, computing device 103, such as an authorization manager, receives a request from computing device 101. In an alternate embodiment, computing device 103 receives a request from computing device 105, such as a resource server. In an embodiment, computing device 103 executing computer program code, such as authorizations 103*a* (and in particular input/output 205 shown in FIG. 2), performs at least a portion of this function.

Logic block 702 illustrates determining whether the first mobile computing device has permission to access the protected resource of the second user. In an embodiment, computing device 103 executing computer program code, such as permission 200 shown in FIG. 2, performs at least a portion of this function. In an embodiment, permission 200 accesses permission data base 200*a* to determine whether the first computing device has permission to access the protected resource of the second user.

Logic block 703 illustrates preparing a request for limited access of the first computing device to the protected resource of the second user when the first mobile computing device does not have permission to access the protected resource of the second user. In an embodiment, computing device 103 executing computer program code, such as authorizations 103*a* (and in particular prepare request 202 shown in FIG. 2), performs at least a portion of this function. In an embodiment, computing device 103 executing computer program code, such as authorizations 103*a* (and in particular input/output 205 shown in FIG. 2), performs at least a portion of this function.

Logic block 704 illustrates outputting the request for limited access of the first computing device to the protected resource of the second user. In an embodiment, computing device 103 executing computer program code, such as authorizations 103*a* (and in particular input/output 205 shown in FIG. 2), performs at least a portion of this function. In embodiments, the limited access of the first computing device to the protected resource may include, but are not limited to, 1) a charge limit on a first account (such as a chargeable account or telecommunication account), 2) a withdrawal limit from a second account (such as a bank or financial account), 3) a time limit to access the protected resource, 4) a portion limit on which portions of the protected resource are accessible (such as access to a portion of an electronic health record, or prescribed prescription portion) and 5) an activity limit on which workflow activities (activities limit) may be approved.

Logic block 705 illustrates receiving a response to the request for limited access of the first computing device to the protected resource of the second user that indicates a limited access of the first computing device. In an embodiment, the response indicates a user input that permits limited access of the first computing device to the protected resource of the second user. In an embodiment, computing device 103 executing computer program code, such as authorizations 103*a* (and in particular input/output 205 shown in FIG. 2), performs at least a portion of this function.

Logic block 706 illustrates outputting authorization information to the first computing device so that the first computing device outputs the authorization information to obtain limited access of the protected resource of the second user. In an embodiment, computing device 103 executing computer program code, such as authorizations 103*a* (and in particular input/output 205 shown in FIG. 2), performs at least a portion of this function.

Figure 8:
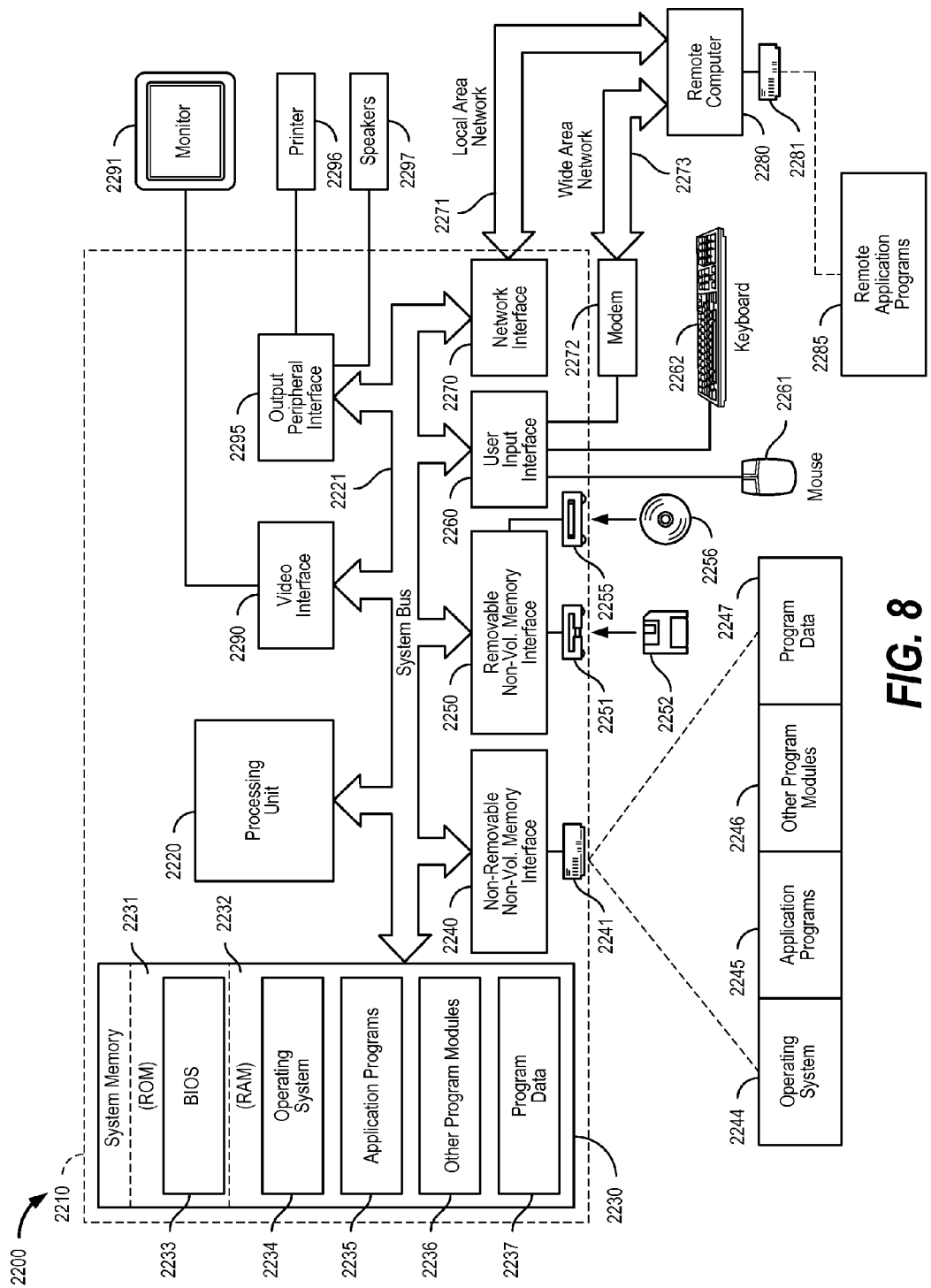
FIG. 8 is a block diagram of a computing device environment according to an embodiment.

The disclosed authorization technology may be used with various computing systems or computing devices. FIG. 8 is a block diagram of an embodiment of a system environment 2200. Computing system environment 2200 includes a general purpose computing device in the form of a computer 2210. In embodiments, computing devices 101-105 shown in FIG. 1 may include one or more components of computer 2210. In embodiments, computing devices 101 and 102 may be a cellular telephone and tablet, respectively, with similar mobile components, such as touchscreens. In embodiments, computing devices 103-105 may include one or more servers having one or more components in computer 2210.

Components of computer 2210 may include, but are not limited to, a processing unit (or core (s)) 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media or processor readable memory. Computer readable media can be any available media that can be accessed by computer 2210 and includes both volatile and nonvolatile media, removable and non-removable media. By way of example, and not limitation, computer readable media may comprise computer readable storage media. Computer readable storage media includes both volatile and nonvolatile, removable and non-removable media implemented in any method or technology for storage of information such as computer readable instructions, data structures, program modules or other data. Computer readable storage media includes, but is not limited to, random access memory (RAM), read only memory (ROM), electrically erasable programmable read only memory (EEPROM), flash memory or other integrated circuit memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer readable storage media in the form of volatile and/or nonvolatile memory such as ROM 2231 and RAM 2232. A basic input/output system (BIOS) 2233, containing the basic routines that help to transfer information between elements within computer 2210, such as during start-up, is typically stored in ROM 2231. RAM 2232 typically contains data and/or program modules that are immediately accessible to and/or presently being operated on by processing unit 2220. The system memory 2230 may store operating system 2234, application program(s) 2235, other program module(s) 2236, and program data 2237. In an embodiment, computer program code as described herein may be at least partially stored in application program(s) 2235. In an embodiment, authorizations 103*a* and integrated circuit processor 103*b* shown in FIG. 1 corresponds to application program(s) 2235 and processing unit 2220.

The computer 2210 may also include other removable/non-removable, volatile/nonvolatile computer readable storage media. The computer 2210 may include a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer readable storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through a non-removable memory interface such as interface 2240, and magnetic disk drive 2251 and optical disk drive 2255 are typically connected to the system bus 2221 by a removable memory interface, such as interface 2250.

The drives and their associated computer readable storage media described above provide storage of computer (processor) readable instructions, data structures, program modules and other data for the computer 2210. Hard disk drive 2241 is illustrated as storing operating system 2244, application program(s) 2245, other program module(s) 2246, and program data 2247. Note that these components can either be the same as or different from operating system 2234, application program(s) 2235, other program module(s) 2236, and program data 2237. Operating system 2244, application program(s) 2245, other program module(s) 2246, and program data 2247 are given different numbers here to illustrate that, at a minimum, they are different copies.

A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. In embodiments, computer 2210 includes input/output software and hardware to output and receive information from other computers on a network. For example, FIG. 8 illustrates a remote computer 2280 that may be a personal computer, a server, a router, a network PC, a peer device or other common network node, and typically includes many or all of the elements described above relative to the computer 2210. In an embodiment, one or more computing devices 101-102 and 104-105 shown in FIG. 1 correspond to remote computer 2280. In an embodiment, input/output software or program modules to transfer information on a network may be stored in network interface 2270 and/or modem 2272. In embodiments, other input/output software may be stored and executed in other components of computer 2210. The logical connections may include a LAN 2271 and a WAN 2273, but may also include other networks. Such networking environments are commonplace in offices, enterprise-wide computer networks, intranets and the Internet.

When used in a LAN networking environment, the computer 2210 is connected to the LAN 2271 through a network interface (or adapter) 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. For example, remote application program(s) 2285 may reside on memory device 2281. It will be appreciated that the network connections shown are exemplary and other means of establishing a communications link between the computers may be used.

The flowchart, sequence diagrams and block diagrams in the Figures illustrate the architecture, functionality, and operation of possible implementations of systems, methods and computer program products according to various aspects of the present disclosure. In this regard, each block in the flowchart or block diagram (or arrow in sequence diagram) may represent a module, segment, or portion of code, which comprises one or more executable instructions for implementing the specified logical function(s). It should also be noted that, in some alternative implementations, the functions noted in the block may occur out of the order noted in the Figures. For example, two blocks (or arrows) shown in succession may, in fact, be executed substantially concurrently, or the blocks (or arrows) may sometimes be executed in the reverse order, depending upon the functionality involved. It will also be noted that each block of the block diagrams or arrows and/or flowchart illustration, and combinations of blocks in the block diagrams or arrows and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this disclosure, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
    creating, by a first computing device, a mutual trust relationship with at least an agent on a second computing device, and an agent on a third computing device, the creating further comprising registering the trust relationship with the second computing device and the third computing device using tokens stored on the second computing device and the third computing device, respectively, the second computing device associated with a first user and the third computing device associated with a second user;
    after the mutual trust relationship is created, receiving, by the first computing device, an access permission request responsive to input from the first user from the second computing device to access a protected resource usable on the second computing device and that is accessible by the third computing device, the protected resource provided by a fourth computing device;
    preparing, by the first computing device, an authorization request to the third computing device to allow the second computing device to permission access the protected resource;
    outputting, by the first computing device, the authorization request to the third computing device;
    receiving, by the first computing device, an indication from the third computing device in response to an input to the third computing device from the second user that the second computing device has permission to access the protected resource; and
    outputting, by the first computing device, authorization information to the second computing device so that the second computing device uses the authorization information to access the protected resource on the fourth computing device.

2. The method of claim 1, wherein the first computing device comprises an integrated circuit processor to execute a computer program code stored on a computer readable storage medium to perform at least the determining and preparing.

3. The method of claim 2, wherein the determining comprises:

the integrated circuit processor executing the computer program code to access a memory location in the computer readable storage medium to determine whether the second computing device has permission to access the protected resource.

4. The method of claim 2, wherein the protected resource is selected from the group consisting of a service, data, application and application program interface, and wherein the protected resource is provided by a resource server.

5. The method of claim 4, wherein the second computing device is a first mobile computing device comprising:
an integrated circuit processor to execute the agent as agent computer program code stored on a computer readable storage medium to attempt to access the protected resource and output the access request to access the protected resource that is accessible by the third computing device after an attempt to access the protected resource.

6. The method of claim 5, wherein the third computing device is a second mobile computing device comprising:
an integrated circuit processor to execute the agent as agent computer program code stored on a computer readable storage medium to provide the authorization request to a user interface and output to the first computing device an indication that the second computing device has permission to access the protected resource in response to an input to the second mobile computing device from a user.

7. The method of claim 1, wherein the preparing comprises:
wherein the creating a mutual trust relationship comprises providing, to the agents on the second and third computing devices, OAuth access tokens which are stored on the second and third computing devices.

8. The method of claim 1, wherein outputting, by the first computing device, the authorization information comprises outputting, by the first computing device, a user token, access token and signed certificate.

9. The method of claim 8, wherein the authorization information includes a limitation to access of the protected resource by the second computing device.

10. A first computing device, comprising:
an integrated circuit processor; and
a computer readable storage medium to store computer program code, the computer program code configures the integrated circuit processor to
create, by the first computing device, a mutual trust relationship with at least an agent on a second computing device, and an agent on a third computing device, including registering the trust relationship with the second computing device and the third computing device using tokens stored on the second computing device and the third computing device, the second computing device associated with a first user and the third computing device associated with a second user;
receive an access permission request responsive to the first user from the agent on the second computing device having the mutual trust relationship with the first computing device, the request being to access a protected resource on the third computing device associated with the second user, the protected resource provided by the fourth computing device,
access an identity of the third computing device that has access to the protected resource,
prepare an authorization request to access the protected resource of the second user,
output the authorization request to access the protected resource of the second user to the third computing device,
receive a response from the agent on the third computing device, in response to an input to the third computing device from the second user, that indicates the second computing device has a permission to a limited access of the protected resource of the second user, and
output, by the first computing device, authorization information to the second computing device so that the first computing device outputs the authorization information to obtain limited access of the protected resource.

11. The apparatus of claim 10, wherein the computer program code configures the integrated circuit processor to access the identity of the third computing device that has access to the protected resource of the second user comprises the computer program code configures the integrated circuit processor to read a memory location in the computer readable storage medium to determine the identity of the third computing device.

12. The apparatus of claim 11, wherein the computer program code configures the integrated circuit processor to prepare the request to access the protected resource of the second user comprises the computer program code configures the integrated circuit processor to prepare the request to access the protected resource that includes an address of an another computing device.

13. The apparatus of claim 10, wherein protected resource is selected from a group consisting of a telecommunication account, financial service account, electronic health record and enterprise workflow.

14. The apparatus of claim 10, wherein the limited access of the protected resource is selected from the group consisting of a charge limit on a chargeable account, a withdrawal limit on a financial account, a time limit to access the protected resource, a portion limit on which portions of the protected resource are accessible and an activities limit on which workflow activities may be approved.

15. The apparatus of claim 10, wherein the integrated circuit processor and computer readable storage medium are embodied as an authorization manager server coupled, by way of a network, to the first computing device embodied as a mobile computing device and the another computing device embodied as another mobile computing device.

16. A non-transitory computer program product, comprising:
a computer readable storage medium having computer program code embodied therewith, the computer program code comprising:
computer program code configured to create a mutual trust relationship between an authorizing computing device and at least an agent on a first mobile computing device of a first user, and an agent on a second mobile computing device of a second user, including code configured to register the trust relationship with the first mobile computing device and the second mobile computing device using tokens stored on the first mobile computing device and the second mobile computing device, respectively;
computer program code configured to receive a request from the agent having the mutual trust relationship on the first mobile computing device of the first user to access a protected resource of the second user that is accessible by the second mobile computing device, the protected resource of the second user provided by a fourth computing device;

computer program code configured to determine whether the first mobile computing device has an initial permission to access the protected resource of the second user by accessing a device permission database storing permissions associated with mobile computing devices;

computer program code configured to prepare a request for limited access of the first mobile computing device to the protected resource of the second user when the first mobile computing device does not have permission to access the protected resource of the second user if the device permission database indicates that the first mobile computing device does not have the initial permission to access the protected resource;

computer program code configured to output, to the agent on the second mobile computing device, the request for limited access of the first mobile computing device to the protected resource of the second user;

computer program code configured to receive a response, output from the agent on the second mobile computing device, to the request for limited access of the first computing device to the protected resource of the second user, in response to an input to the second mobile computing device from the second user, that indicates a limited access of the first computing device; and computer program code configured to output authorization information to the first mobile computing device so that the first computing device outputs the authorization information to obtain limited access of the protected resource of the second user on the fourth computing device;

wherein the limited access of the first mobile computing device of the protected resource of the second user is selected from the group consisting of a charge limit on a first account, a withdrawal limit from a second account, a portion limit on which portions of the protected resource of the second user are accessible and an activity limit on which workflow activities may be approved.

17. The non-transitory computer program product of claim 16, wherein the authorization information is selected from the group consisting of a user token, access token and signed certificate.

18. The non-transitory computer program product of claim 17, wherein protected resource of the second user is selected from a group consisting of a telecommunication account, financial service account, electronic health record and enterprise workflow.

* * * * *